PEAK AMPLITUDE DETECTOR

Filed March 10, 1959

INVENTOR.
WHEELER M. TURNER
BY
Christie, Parker & Hale
ATTORNEYS

United States Patent Office 2,961,537

Patented Nov. 22, 1960

2,961,537

PEAK AMPLITUDE DETECTOR

Wheeler M. Turner, Santa Barbara, Calif., assignor to Arnoux Corporation, Los Angeles, Calif., a corporation of California Filed Mar. 10, 1959, Ser. No. 798,458

8 Claims. (Cl. 328—151)

Figure 1:
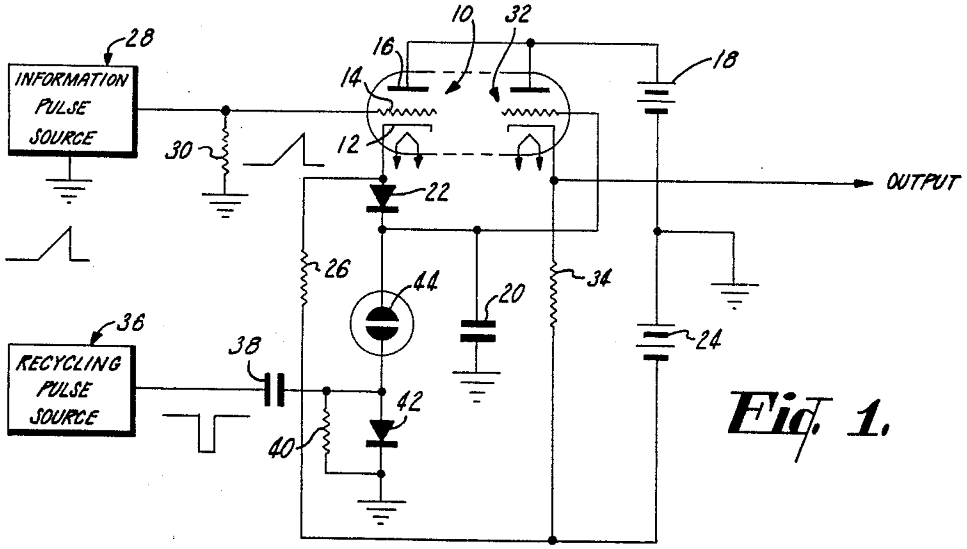

This invention relates to peak amplitude detectors, and more particularly, is concerned with a recycling type of detector for pulse amplitude demodulation.

The use of a recycling type of detector in demodulating pulse amplitude modulated signals, for example, is well known. Such devices generally include a storage capacitor which is charged up to the peak amplitude of the input waveform and then periodically discharged. While relatively simple circuits have been devised for accomplishing the basic requirements of a recycling detector, such known circuits are generally limited in their operating characteristics. Thus where they are recycled at relatively slow rates, they are subject to slope-off, i.e., gradual loss of charge across the storage capacitor from the peak charge level. Where larger storage capacitors are used to retain the peak signal for required periods of time, the charge rate may be too slow to accommodate the desired pulse repetition rate at the input of the demodulator.

While circuits have been designed to accommodate high pulse repetition rates and at the same time perform at a slow recycling pulse rate, they have generally been relatively complicated and particularly sensitive to component design characteristics and values. Thus it has been necessary to change component values in such known circuits to accommodate an extended range of input pulse repetition rates, for example.

Another difficulty which has been encountered in prior art recycling detector circuits is the generation of large output voltage spikes during the recycling period due to the discharge of the storage capacitor.

These and other limitations in known prior art circuits have been overcome by the present invention, which provides a recycling detector circuit which is relatively simple in its design and construction, yet provides greatly improved operating characteristics. In particular, the present invention provides a circuit which requires no change in values of components to operate over a large range of pulse repetition rates, and yet the circuit is capable of holding its peak charge level for a relatively long period of time where low recycling rates are employed. During the recycling time the storage capacitor is discharged only to the instantaneous level of the input signal, where the latter has dropped below the level stored on the capacitor, rather than discharging the capacitor to zero charge. The present circuit thereby eliminates objectionably large voltage spikes on the output.

These and other advantages of the present invention are achieved by a recycling detector circuit comprising a cathode follower type circuit having a storage capacitor in the cathode. A first diode is connected in series with the storage capacitor in the cathode circuit of the cathode follower stage and connected to normally conduct current in the direction from the cathode to the storage capacitor. The first diode is back-biased by a negative potential applied to the cathode through a large bias resistor, the diode having a high reverse current impedance to prevent any leakage current from the storage capacitor which otherwise would result in slope-off at the output. Recycling is accomplished by a neon tube and second diode connected in series across the storage capacitor. The neon tube is fired by a negative pulse, providing a low impedance discharge path for the storage capacitor.

Figure 2:
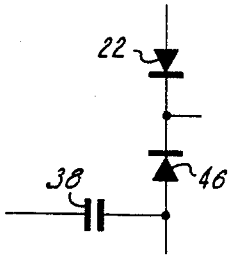

For a more complete understanding of the invention, reference should be had to the accompanying drawing, wherein:

Fig. 1 is a schematic wiring diagram of the preferred embodiment of the invention; and Fig. 2 shows a modification to the circuit of Fig. 1.

Referring in detail to the form of the invention as shown in Fig. 1, the numeral 10 indicates generally a conventional triode including a cathode 12, a control grid 14, and a plate 16. The triode 10 is connected as a cathode follower stage with a positive potential applied to the plate 16 by means of a battery 18. The cathode load circuit includes a storage capacitor 20 connected to the cathode 12 through a diode 22 of a type selected for its high reverse current impedance. The diode 22 is back-biased by a battery 24 by means of which a negative potential is applied to the cathode 12 through a large bias resistor 26. A pulse modulated signal or other input signal having voltage peaks is applied to the grid 14 from an input signal source indicated generally at 28. The grid 14 may be connected to a common return through a grid leak resistor 30.

In the operation of the circuit as thus far described, the capacitor 20 normally charges up through the diode 22 to a potential at which the triode 10 is cut off. With a type 12AU7 triode, for example, this level is substantially 12 volts for the potential of the cathode with relation to the control grid. Any increase in the level of the control grid produces a corresponding increase in the charge across the storage capacitor 20. However, any decrease of the grid potential with relation to the cathode has no effect on the charge on the capacitor 20, since the tube is cut off.

The principal leakage path for the storage capacitor 20 in the absence of the diode 22 is the heater to cathode leakage of the tube 10. This flow of leakage current is blocked by the high back current impedance of the diode 22. The resistor 26 connected to the negative potential source 24 provides a back bias on the diode 22 at all times.

The information pulses derived from the source 28 are positive going pulses which drive the potential of the control grid 14 to the positive peak value. As a result a proportional positive charge is produced on the storage capacitor 20. An output can be derived across the storage capacitor 20 by a cathode follower stage including a triode 32 having a cathode load resistor 34. The cathode follower stage reflects a high impedance across the storage capacitor 20, preventing its discharge, and at the same time presents a low output impedance across the resistor 34.

Recycling is accomplished by negative pulses derived from a suitable recycling pulse source such as indicated generally at 36. These negative pulses are differentiated by a differentiating network including a capacitor 38 and a resistor 40 by which a strong negative-going voltage spike is generated in response to the leading edge of the negative pulse from the source 36. A diode 42 connected in shunt with the resistor 40 prevents any positive pulse from being produced across the resistor 40 in response to the trailing edge of the differentiated negative pulse from the recycling source 36.

According to the form of the invention as shown in Fig. 1, a neon tube or similar cold cathode discharge tube, such as indicated at 44, is connected between the resistor 40 of the differentiating network and the storage capacitor 20.

The operation of the circuit can best be appreciated by assuming some typical operating values. For example, information input pulses may typically range in peak value from zero to over fifty volts, returning to −25 volts between samples. The diode 22 might have a forward drop of 0.7 volt, and the neon tube 44 may be assumed to have a firing voltage of 90 volts and extinguishing voltage of 50 volts. The recycling pulse is assumed to be −200 volts in magnitude.

Under these conditions, assume the storage capacitor 20 has a full scale charge of 46 volts, the grid 14 is at −25 volts, the neon tube is extinguished, and the junction of the capacitor 38, diode 42, and neon tube 44 is at zero volts. The cathode 12 will assume a potential of approximately −19 volts due to the load resistor 26. If a recycling pulse is then applied to the capacitor 38 from the source 36 and a full scale information pulse is applied to the grid 14 from the information source 28, the potential across the neon tube is raised by the recycling pulse to 246 volts; the 200 volts of the recycling pulse plus the 46 volts on the storage capacitor 20. This fires the neon tube 44, providing a low impedance discharge path for the capacitor 20. However, as soon as the capacitor 20 drops 0.7 volt, the diode 22 becomes forward biased and the cathode follower now presents a low impedance current path for charging the capacitor 38. The capacitor 38 begins to charge up rapidly while the capacitor 20 remains at substantially 45.3 volts.

When the capacitor 38 has charged up 196 volts from the −200 volts at the recycling pulse source 36, the voltage across the neon tube drops to 50 volts and is extinguished. The capacitor 20 then recharges back up to to the full 46 volts. At the end of the recycling pulse, the capacitor 38 discharges through the diode 42 and returns to zero.

From this it can be seen that if the next information pulse is zero volts, the capacitor 20 discharges approximately 46 volts and the capacitor 38 in series, if equal to the capacitor 20, charges 46 volts, the same amount. The capacitor 38 then continues to charge up through the cathode follower until the neon tube 44 is extinguished. If the capacitor 38 were only half as large as the capacitor 20, it would need to charge up 92 volts while the capacitor 20 discharged 46 volts. Thus an important relationship exists between the values of the two capacitors as a function of the magnitude of the recycling pulse, the maximum charge to be removed from the storage capacitor 20, and the extinguishing voltage of the neon tube, which can be expressed:

$$C_{38}=\frac{C_{20}}{\frac{E_{cyc}-(K+V_{20})}{V_{20}}}$$

where $E_{cyc}$ is the negative voltage of the recycling pulse, K is extinguishing voltage of the neon tube, and $V_{20}$ is the maximum voltage charge removed from the capacitor 20.

Where large peaks are sometimes encountered on the input, the neon tube 44 may be prematurely fired. Where such is apt to happen, a diode 46 may be used in place of neon tube 44, as shown in Fig. 2. The recycling pulse increases the back bias on the diode 46 beyond the zener point, causing the diode to break down and discharge the capacitor 20. Crystal diodes having much larger breakdown voltages than neon tubes are unaffected by repeated breakdowns and are readily available.

What is claimed is:

1. A recycling pulse amplitude detector circuit for producing an output potential proportional to the peak value of an input signal comprising a vacuum tube having a control grid, a cathode and a plate, a first diode having a large back-current impedance, a storage capacitor coupled to the cathode through the first diode and to a common return, the first diode being connected to permit low impedance current flow from the cathode to the capacitor, means for applying a positive potential to the plate with respect to the common return, the input signal being coupled to the grid and the peak output potential being derived across the storage capacitor, means including a large series resistor for applying a negative potential to the cathode with respect to the common return, whereby the first diode is normally back biased to prevent current flow from the storage capacitor to the cathode, and means for recycling the peak detector by discharging the storage capacitor including a gas discharge tube and a second diode connected in series across the storage capacitor, and means for applying a negative potential across the second diode of sufficient magnitude to fire the gas discharge tube, whereby the gas discharge tube provides a low impedance discharge path for the storage capacitor.

2. A recycling pulse amplitude detector circuit for producing an output potential proportional to the peak value of an input signal comprising a vacuum tube having a control grid, a cathode and a plate, a first diode having a large back-current impedance, a storage capacitor coupled to the cathode through the first diode and to a common return, the first diode being connected to permit low impedance current flow from the cathode to the capacitor, means for applying a positive potential to the plate with respect to the common return, the input signal being coupled to the grid and the peak output potential being derived across the storage capacitor, means including a large series resistor for applying a negative potential to the cathode with respect to the common return, whereby the first diode is normally back biased to prevent current flow from the storage capacitor to the cathode, and means for recycling the peak detector by discharging the storage capacitor including means having a voltage breakdown characteristic and a second diode connected in series across the storage capacitor, and means for applying a negative potential across the second diode of sufficient magnitude to break down said means, whereby the voltage breakdown means provides a low impedance discharge path for the storage capacitor.

3. Apparatus as defined in claim 2 wherein said voltage breakdown means comprises a crystal diode biased in a reverse current flow direction by the applied negative potential.

4. A recycling pulse amplitude detector circuit for producing an output potential proportional to the peak value of an input signal comprising a vacuum tube having a control grid, a cathode and a plate, a diode having a large back-current impedance, a storage capacitor coupled to the cathode through the diode and to a common return, the diode being connected to permit low impedance current flow from the cathode to the capacitor, means for applying a positive potential to the plate with respect to the common return, the input signal being coupled to the grid and the peak output potential being derived across the storage capacitor, means including a large series resistor for applying a negative potential to the cathode with respect to the common return, whereby the diode is normally back biased to prevent current flow from the storage capacitor to the cathode, and means for recycling the peak detector by discharging the storage capacitor including electronic switching means connected across the storage capacitor, and means for actuating said switching means in response to a recycling pulse to discharge the storage capacitor.

5. A recycling pulse amplitude detector circuit for producing an output potential proportional to the peak value of an input signal comprising a vacuum tube having a control grid, a cathode and a plate, a first diode having a large back-current impedance, a storage capacitor coupled to the cathode through the first diode and to a common return, the first diode being connected to permit low impedance current flow from the cathode to the capacitor, means for applying a positive potential to the plate with respect to the common return, the input signal being coupled to the grid and the peak output potential being derived across the storage capacitor, and means for recycling the peak detector by discharging the storage capacitor including a gas discharge tube and a second diode connected in series across the storage capacitor, and means for applying a negative potential across the second diode of sufficient magnitude to fire the gas discharge tube, whereby the gas discharge tube provides a low impedance discharge path for the storage capacitor.

6. A recycling pulse amplitude detector circuit for producing an output potential proportional to the peak value of an input signal comprising a vacuum tube having a control grid, a cathode and a plate, a storage capacitor coupled to the cathode and to a common return, means for applying a positive potential to the plate with respect to the common return, the input signal being coupled to the grid and the peak output potential being derived across the storage capacitor, and means for recycling the peak detector by discharging the storage capacitor including a gas discharge tube and a diode connected in series across the storage capacitor, and means including a coupling capacitor for applying a negative potential across the diode of sufficient magnitude to fire the gas discharge tube, whereby the gas discharge tube provides a low impedance discharge path for the storage capacitor.

7. A recycling pulse amplitude detector circuit for producing an output potential proportional to the peak value of an input signal comprising a vacuum tube having a control grid, a cathode and a plate, a storage capacitor coupled to the cathode, means for applying a positive potential to the plate with respect to the common return, the input signal being coupled to the grid and the peak output potential being derived across the storage capacitor, means for recycling the peak detector by discharging the storage capacitor including means having a voltage breakdown characteristic and a diode connected in series across the storage capacitor, and means including a coupling capacitor for applying a negative potential across the diode of sufficient magnitude to break down said means, whereby the voltage breakdown means provides a low impedance discharge path for the storage capacitor.

8. Apparatus for producing a sustained voltage level proportional to the peak amplitude of a pulsed input signal, said apparatus comprising a cathode follower stage for applying a unipolar charge on the storage capacitor, the peak amplitude input signal being applied to the input of the cathode follower stage, a voltage breakdown device and a diode connected in series with each other and connected in shunt across the storage capacitor, the diode being connected to provide a low impedance discharge path in response to a voltage breakdown of said device, a coupling capacitor connected to the series connection point between the diode and said device, a negative potential being applied across the coupling capacitor and diode to discharge the storage capacitor to a level determined by the instantaneous voltage level of the peak amplitude input signal.

References Cited in the file of this patent

UNITED STATES PATENTS 2,719,225 Morris ---------------- Sept. 27, 1955